United States Patent
Chen et al.

(10) Patent No.: US 8,420,707 B2
(45) Date of Patent: Apr. 16, 2013

(54) BIOMASS COMPOSITE COMPOSITION AND FOAMING METHOD THEREOF

(75) Inventors: Jong-Wu Chen, Taichung (TW);
Hsiang-Jen Hsiao, Taichung (TW);
Chia-Hung Li, Taichung (TW);
Chin-Fu Chen, Taichung (TW)

(73) Assignee: Chin-fu Chen, Taichung (TW)

( * ) Notice: Subject to any disclaimer, the term of this patent is extended or adjusted under 35 U.S.C. 154(b) by 262 days.

(21) Appl. No.: 12/907,319

(22) Filed: Oct. 19, 2010

(65) Prior Publication Data
US 2012/0053256 A1   Mar. 1, 2012

(30) Foreign Application Priority Data
Aug. 25, 2010   (TW) .............................. 99128445 A

(51) Int. Cl.
*C08L 25/00* (2006.01)
*C08J 9/12* (2006.01)

(52) U.S. Cl.
USPC .......... 521/149; 521/134; 521/139; 521/140; 521/144; 521/145; 521/146

(58) Field of Classification Search .................. 521/149, 521/134, 140, 144, 145, 146, 190, 411, 419
See application file for complete search history.

(56) References Cited

U.S. PATENT DOCUMENTS
6,509,384 B2 * 1/2003 Kron et al. ....................... 521/56
7,256,223 B2 * 8/2007 Mohanty et al. ............. 523/124
2007/0087131 A1 * 4/2007 Hutchinson et al. .......... 427/533
2008/0118765 A1 * 5/2008 Dorgan et al. ................ 428/532
2009/0123728 A1 * 5/2009 Cheung et al. ............. 428/304.4
2010/0093942 A1 * 4/2010 Silvis et al. .................... 525/240

FOREIGN PATENT DOCUMENTS
TW         I288765      * 10/2007

OTHER PUBLICATIONS

Yoo, T.W.; Yoon, H.G. "Effects of Compatibilizers on the Mechanical Properties and Interfacial Tension of Polypropylene and Poly(lactic acid) Blends" Macromolecular Research, vol. 18, No. 6, pp. 583-588. Jan. 1, 2010.*
Lee, S.T.; Kareko, L.; Jun, J. "Study of Thermoplastic PLA Foam Extrusion" Journal of Cellular Plastics, vol. 44, pp. 293-305. Jun. 2008.*
Arkema, Inc. "Biostrength 150 Impact Modifier". 2007.*
Lee, S.T. "Study of Thermoplastic PLA Foam Extrusion" in Journal of cellular plastics, 44, pp. 293-305, 2008.*
Yoo, T.W; Yoon, H.G. "Effects of Compatibilizers on the Mechanical Properties and Interfacial Tension of Polypropylene and Poly(lactic acid) Blends" in Macromolecular Research, vol. 18, No. 6, pp. 583-588.*

* cited by examiner

*Primary Examiner* — Randy Gulakowski
*Assistant Examiner* — Christina Wales
(74) *Attorney, Agent, or Firm* — Browdy and Neimark, PLLC

(57) ABSTRACT

Disclosed herein are a biomass composite composition and a foaming method thereof. The biomass composite composition includes (a) polyester alloy containing biodegradable polyester and petrochemical plastic, (b) reinforcing agent, (c) foaming agent, (d) compatibilizer, (e) lubricant, and (f) impact modifier. The biomass composite composition of the present invention is biodegradable and of heat resistance and melt strength suitable for manufacture of foam products.

16 Claims, 2 Drawing Sheets

BIOMASS COMPOSITE COMPOSITION AND FOAMING METHOD THEREOF

BACKGROUND OF THE INVENTION

1. Field of the Invention

The present invention relates generally to a biomass composite composition and a foaming method thereof and more particularly, to a biomass composite composition having heat resistance and melt strength suitable for the manufacture of foam product, and a foaming method of the composition.

2. Description of the Related Art

Because plastic causes serious damage to environment, biomass materials are expected to replace petroleum-based plastic as the environment protection consciousness rises. However, it is difficult to produce foam product from biomass materials through traditional foaming method because of its poor heat resistance, such that the application of biomass materials is more limited.

The prior art about manufacturing foam product is enumerated as follows.

1. Taiwan Patent Publication No. 00328545 entitled "Process for the Production of Products of Light Cellular Plastic with Closed Cells" is a process for the production of products of light cellular plastic with closed cells from a plastic composition containing chemical blowing agent and, optionally, other process-regulative substances and additives. Besides, the suitable raw material from which the foam product is made in the prior art is polyurethane, thermoplastic polyamide, epoxy resin or ethylene vinyl acetate (EVA).

2. Taiwan Patent No. I227186 entitled "A Method for Manufacturing Thermoplastic Elastomer Composites under Normal Pressure by a Continuous Foaming Processing" disclosed a method for manufacturing a foam product from a thermoplastic elastomer based composite with the addition of blowing agent and crosslinking agent by a traditional continuous foaming process. Besides, the thermoplastic elastomer used in this method is styrene-butadiene-styrene (SBS), styrene-ethylene/butylene-styrene (SEBS) or styrene-isoprene-styrene (SIS).

3. Taiwan Patent Publication No. 00194501 entitled "Foamed Acrylic Polymer Compositions" disclosed a composition comprising a mixture including 40-90% by weight of a methacrylate ester monomer, 10-60% by weight of polymer, a free radical-producing catalyst, and a foaming agent. Examples of the aforesaid methacrylate ester monomer are methyl methacrylate, ethyl methacrylate, isobutyl methacrylate, n-butyl methacrylate, and the like.

4. Taiwan Patent Publication No. 00400356 entitled "Plastic Blowing Material and Method for Producing the Same" disclosed a method comprising melt blending a styrene-based plastic with a crosslinkable blowing polyolefin and a suitable compatibilizer to thereby produce a styrene-based blowing material. The aforesaid plastic blowing material comprises 50-85 parts of a styrene-based plastic, 15-50 parts of a polyolefin, 10-30 parts of a compatibilizer, 1-10 parts of a blowing agent, 1-2 parts of a crosslinking agent, and 0-2 parts of a blowing promoter and other additives.

5. Taiwan Patent No. I238767 entitled "A Method for Manufacturing Thermoplastic Elastomer Composites having sandwich structure by a Continuous Foaming Processing" disclosed a method for manufacturing a foam product, comprising adding compounding agent, blowing agent, and crosslinking agent into a thermoplastic elastomer based composite, kneading and extruding to form a first sheet, forming a second sheet through the same process, overlying a reinforced sheet and the first sheet on the second sheet to form a sandwich structure, and performing foam process. Besides, the thermoplastic elastomer applied in this method is styrene-butadiene-styrene (SBS), styrene-ethylene/butylene-styrene (SEBS), or styrene-isoprene-styrene (SIS).

As stated above, most of the general raw materials for producing foam products are petroleum-based plastic having superior heat resistance, high melt strength, and high mechanical strength. However, overuse of the petroleum-based plastic leads to waste of resources and is very environmentally unfriendly.

Although a prior biomass composite obtained by blending biomass material and petroleum-based plastic is partially biodegradable, the heat resistance and mechanical strength of the aforesaid biomass composite are inferior, such that it can only be the raw material for plastic injection products or other plastic molding products rather than foamed products. That is, the aforesaid biomass composite cannot be used to produce foamed products such as blades of shutter, heat insulation material, signboard, sound insulation material, ceiling, siding, etc.

SUMMARY OF THE INVENTION

The primary objective of the present invention is to provide a biomass composite composition for preparing a foamed product.

It is another objective of the present invention to provide a biomass composite composition for preparing a foamed product with specific mechanical strength.

It is further another objective of the present invention to provide a foaming method of the biomass composite composition.

In order to achieve the aforesaid objectives, the present invention provides a biomass composite composition comprising (a) polyester alloy containing 40-50% by weight of biodegradable polyester and 50-60% by weight of petrochemical plastic, (b) 15 to 20 phr of reinforcing agent, (c) 0.1 to 5 phr of foaming agent, (d) 1 to 3 phr of compatibilizer, (e) 1 to 3 phr of lubricant and (f) 1 to 3 phr of impact modifier.

In the present biomass composite composition, the biodegradable polyester of polyester alloy may be poly lactic acid (PLA), poly butylene succinate (PBSU) or biodegradable copolyester, and preferably be PLA. The petrochemical plastic of polyester alloy may be poly carbonate (PC), poly methyl methacrylate (PMMA) or polypropylene (PP), and preferably be PC.

In the present biomass composite composition, the reinforcing agent may be selected from the group consisting of talc powder, clay, mica, calcium carbonate, silicon dioxide, plant fiber, artificial fiber, wood flour, and sawdust.

In the present biomass composite composition, the foaming agent may be core-shell expandable microsphere, or core-shell expandable microsphere masterbatch made from the aforesaid core-shell expandable microsphere.

In the present biomass composite composition, the compatibilizer may be fluoroplastic grafted with acrylic acid. Besides, the lubricant may be at least one selected from stearic acid and its derivatives comprising calcium stearate, zinc stearate, magnesium stearate and stearamide.

In the present biomass composite composition, the impact modifier may be a compound with a core-shell structure. Preferably, the shell may be a polymer selected from a group consisting of olefin polymer, poly lactic acid biomass polymer, polycaprolactone biomass polymer, and polyglycolic acid biomass polymer. When the shell is olefin polymer, methacrylic acid polymer is preferable. In addition, the impact modifier applied to the present composition is preferably methacrylate-butadiene-styrene (MBS) copolymer.

In addition, the biomass composite composition can further comprises (g) polyolefin elastomer (POE) which is contained in an amount of 1 to 10 phr, and preferably, the polyolefin elastomer may be polyolefin elastomer-graft-maleic anhydride (POE-g-MA).

The present invention also provides a foaming method of the biomass composite composition and the foaming method comprises the steps of:

(a) well mixing polyester alloy comprising 40-50% by weight of biodegradable polyester and 50-60% by weight of petrochemical plastic, and based on 100 parts of the polyester alloy, 15 to 20 phr of reinforcing agent, 1 to 3 phr of compatibilizer, 1 to 3 phr of lubricant, 1 to 3 phr of impact modifier, and 1 to 10 phr of polyolefin elastomer to obtain a mixture;

(b) compounding and processing the mixture obtained from the step (a) to particles;

(c) drying off the particles from the step (b);

(d) dry mixing the dried particles from the step (c) with 0.1 to 5 phr of foaming agent;

(e) foaming and extruding the particles from the step (d); and (f) cooling the product obtained from the step (e).

In the present foaming method, the compound production of the step (b) may be accomplished by a double screw extruder, an intensive mixer, or a kneader, and preferably by the double screw extruder; besides, the processing temperature of the step (b) preferably ranges from 180° C. to 220° C. The foaming and extrusion of the step (e) may be accomplished by a profile extruder, and the pressure is preferably equal to the normal atmospheric pressure and the temperature preferably ranges from 200° C. to 210° C. The cooling of the step (f) may be accomplished by a refrigeration shaping mold, and the temperature preferably ranges from 0° C. to 10° C.

Because the biomass composite composition of the present invention is of biodegradable property and has improved heat resistance and melt strength, the composition of the present invention belongs to an environment protection raw material which is suitable for the manufacture of foam product, and is applicable to continuous foam extrusion process. Furthermore, a foam product produced from the biomass composite composition of the present invention has good heat resistance and specific mechanical strength and is partially biodegradable.

DETAILED DESCRIPTION OF THE INVENTION

Figure 1:
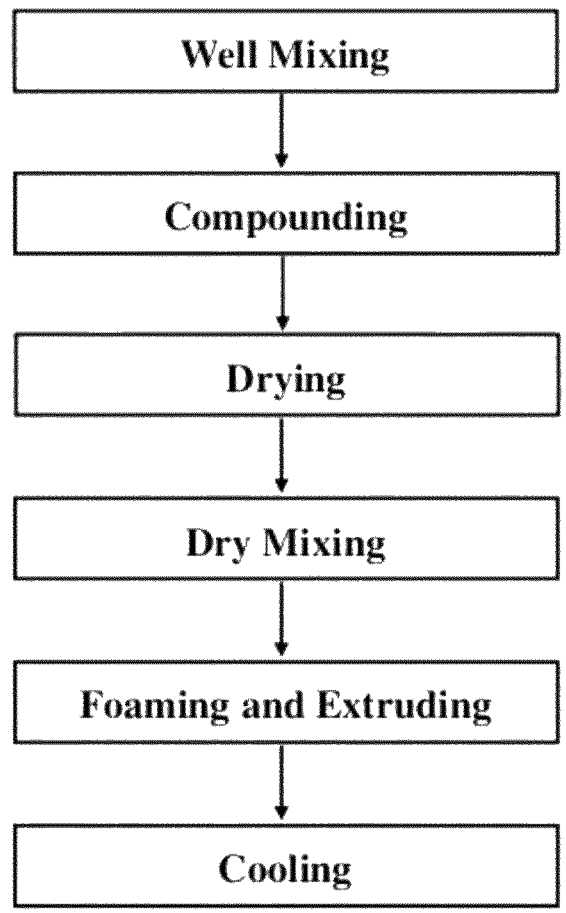
FIG. 1 is a flowchart of the foaming method according to the present invention.

Hereinafter, a detailed description is given through the following embodiments of the present invention, which are set forth to illustrate, but are not to be construed as the limit of the present invention.

The biomass composite composition of the present invention is obtained through blending biodegradable material and petrochemical plastic, such that the present composition has both advantages of biodegradable material and petrochemical plastic, namely biodegradable property, and heat resistance and melt strength suitable for foaming process.

The biomass composite composition according to the present invention comprises (a) polyester alloy, (b) reinforcing agent, (c) foaming agent, (d) compatibilizer, (e) lubricant, and (f) impact modifier. Each constituent of the biomass composite composition of the present invention is described in further detail below.

In the biomass composite composition of the present invention, the polyester alloy includes biodegradable polyester for rendering partially degradable property to the present composition, and petrochemical plastic for improving the heat resistance of the present composition. Preferably, the biodegradable polyester is comprised in the polyester alloy in 40-50 wt % and the petrochemical plastic is comprised in the polyester alloy in 50-60 wt %. If the content of the biodegradable polyester is below 40 wt %, such that the content of the petrochemical plastic is relatively higher, the foam product made from the present composition has inferior biodegradable property. On the contrary, if the content of the biodegradable polyester exceeds 50 wt %, heat resistance of the present composition worsens because of the relatively lower content of the petrochemical plastic.

For the biodegradable polyester, it can preferably be poly lactic acid (PLA), poly butylene succinate (PBSU), or biodegradable copolyester, and more preferably be PLA.

For the petrochemical plastic, it can preferably be poly carbonate (PC), poly methyl methacrylate (PMMA), or polypropylene (PP), and more preferably be PC.

In the biomass composite composition of the present invention, the reinforcing agent is used to enhance the mechanical strength and heat resistance of the foam product made from the present composition.

Preferably, the reinforcing agent is contained in an amount of 15 to 20 phr based on 100 parts of the polyester alloy. If the content of the reinforcing agent is below 15 phr, heat resistance of the present composition worsens. On the contrary, if the content of the reinforcing agent exceeds 20 phr, the foaming of the present composition is inhomogeneous because of inferior fluidity of the foaming agent. Thus, the content of the reinforcing agent is preferably controlled within the aforesaid range.

Preferably, the reinforcing agent is selected from, but not limited to, the group consisting of talc powder, clay, mica, calcium carbonate, silicon dioxide, plant fiber, artificial fiber, wood flour, and sawdust. More preferably, the reinforcing agent is talc powder.

In the biomass composite composition of the present invention, the foaming agent is used to foam the present composition.

Preferably, the foaming agent is contained in an amount of 0.1 to 5 phr based on 100 parts of the polyester alloy. If the content of the foaming agent is below 0.1 phr, the present composition cannot be foamed. On the contrary, if the content of the foaming agent exceeds 5 phr, the foam product made from the present composition is lightweight and mechanical strength thereof worsens. Thus, the content of the foaming agent is preferably controlled within the aforesaid range.

Preferably, the foaming agent is core-shell expandable microsphere or core-shell expandable microsphere masterbatch made from the aforesaid core-shell expandable microsphere. expandable microsphere is an expanding microsphere consisted of a thermoplastic polymer shell, such as vinylidene chloride/acrylonitrile copolymer, polyvinyl alcohol, polyvinyl butyral, polymethyl methacrylate, polyacrylonitrile, polyvinylidene chloride, and polystyrene, encapsulating a hydrocarbon gas, such as isobutane, propane, and pentane.

When the gas inside the shell is heated, it increases in pressure and the thermoplastic polymer shell softens, resulting in a dramatic increase in the volume of the microsphere.

For the carrier of the core-shell expandable microsphere masterbatch, it is preferably selected from polyethylene, polypropylene, polymethyl methacrylate or poly (ethylene vinyl acetate) copolymer.

In order to describe the present invention in concise manner, "expandable microsphere (masterbatch)" indicates both "expandable microsphere" and "expandable microsphere masterbatch".

Preferably, the core-shell expandable microsphere masterbatch is polyolefin expandable microsphere (masterbatch), polyolefin ester expandable microsphere masterbatch, or biodegradable expandable microsphere (masterbatch). More preferably, the polyolefin expandable microsphere (masterbatch) is polypropylene expandable microsphere (masterbatch), in which the carrier of polypropylene expandable microsphere (masterbatch) is polyethylene. More preferably, the polyolefin ester expandable microsphere (masterbatch) is polymethyl methacrylate expandable microsphere (masterbatch), in which the carrier of polymethyl methacrylate expandable microsphere (masterbatch) is poly (ethylene vinyl acetate) copolymer. More preferably, the biodegradable expandable microsphere (masterbatch) is poly lactic acid biomass polymer expandable microsphere (masterbatch), polycaprolactone biomass polymer expandable microsphere (masterbatch), or polyglycolic acid biomass polymer expandable microsphere (masterbatch).

In the biomass composite composition of the present invention, the compatibilizer is used to improve the compatibility between the biodegradable polyester and petrochemical plastic.

Preferably, the compatibilizer is contained in an amount of 1 to 3 phr based on 100 parts of the polyester alloy. If the content of the compatibilizer is below 1 phr, the compatibility between the biodegradable polyester and petrochemical plastic worsens. On the contrary, if the content of the compatibilizer exceeds 3 phr, the cost of the present composition increases. Thus, the content of the compatibilizer is preferably controlled within the aforesaid range.

Preferably, the compatibilizer is fluoroplastic grafted with acrylic acid.

In the biomass composite composition of the present invention, the lubricant is used to improve the compatibility between the polyester alloy and the reinforcing agent, as well as the lubricity between the present composition and a machine for foaming process.

Preferably, the lubricant is contained in an amount of 1 to 3 phr based on 100 parts of the polyester alloy. If the content of the lubricant is below 1 phr, the compatibility between the polyester alloy and the reinforcing agent worsens. On the contrary, if the content of the lubricant exceeds 3 phr, the present composition is oily and has yellowing phenomenon. Thus, the content of the lubricant is preferably controlled within the aforesaid range.

Preferably, the lubricant is at least one selected from the group consisting of stearic acid and it derivatives comprising calcium stearate, zinc stearate, magnesium stearate, and stearamide. More preferably, the lubricant is N, N-ethylene-bis-stearamide.

In the biomass composite composition of the present invention, the impact modifier is used to enhance the impact resistance and toughness of the foam product made from the present composition.

Preferably, the impact modifier is contained in an amount of 1 to 3 phr based on 100 parts of the polyester alloy. If the content of the impact modifier is below 1 phr, the compatibility between the biodegradable polyester and petrochemical plastic worsens. On the contrary, if the content of the impact modifier exceeds 3 phr, the cost of the present composition increases. Thus, the content of the impact modifier is preferably controlled within the aforesaid range.

Preferably, the impact modifier is a compound with a core-shell structure, and the shell is preferably olefin polymer, poly lactic acid biomass polymer, polycaprolactone biomass polymer, or polyglycolic acid biomass polymer; more specifically, the impact modifier is methacrylate-butadiene-styrene (MBS) copolymer.

Further, another biomass composite composition according to the present invention comprises (a) polyester alloy, (b) reinforcing agent, (c) foaming agent, (d) compatibilizer, (e) lubricant, (f) impact modifier, and (g) polyolefin elastomer (POE).

Components (a) to (f) are the same as the above-mentioned constituents, so no more description is necessary.

For polyolefin elastomer, it is used to enhance the impact resistance of the foam product made from the present composition, as well as melt strength of the present composition.

Preferably, the polyolefin elastomer is contained in an amount of 1 to 10 phr based on 100 parts of the polyester alloy. If the content of the polyolefin elastomer is below 1 phr, the foaming of the present composition is inhomogeneous. On the contrary, if the content of the polyolefin elastomer exceeds 10 phr, heat resistance of the present composition worsens. Thus, the content of the polyolefin elastomer is preferably controlled within the aforesaid range.

Preferably, the polyolefin elastomer is polyolefin elastomer-graft-maleic anhydride (POE-g-MA).

As shown in FIG. 1, the foaming method for biomass composite composition according to the present invention comprises the steps of:

(a) well mixing polyester alloy comprising 40-50% by weight of biodegradable polyester and 50-60% by weight of petrochemical plastic, and based on 100 parts of the polyester alloy, 15 to 20 phr of reinforcing agent, 1 to 3 phr of compatibilizer, 1 to 3 phr of lubricant, 1 to 3 phr of impact modifier, and 1 to 10 phr of polyolefin elastomer to obtain a mixture;

(b) compounding and processing the mixture obtained from the step (a) to particles;

(c) drying off the particles from the step (b);

(d) dry mixing the dried particles from the step (c) with 0.1 to 5 phr of foaming agent;

(e) foaming and extruding the particles from the step (d); and (f) cooling the product obtained from the step (e).

In the present foaming method, the compound production of the step (b) is preferably accomplished by a double screw extruder, an intensive mixer, or a kneader; and more preferably by the double screw extruder. Preferably, the processing temperature of step (b) ranges from 180° C. to 220° C. Besides, the foaming and extrusion of the step (e) is preferably accomplished by a profile extruder. Preferably, the step (e) is performed in a pressure equal to the normal atmospheric pressure and in a temperature ranging from 200° C. to 210° C. Further, the cooling of the step (f) is preferably accomplished by a refrigeration shaping mold and performed in a temperature ranging from 0° C. to 10° C.

Hereinafter, the present invention is described further in detail through examples. However, the following examples are only for the understanding of the present invention and they should not be construed to limit the scope of the present invention.

Examples 1 to 29

Mixtures were prepared with the constituents and contents given in Table 1 below except for the foaming agent. Each of the aforesaid mixture was poured into a double screw extruder at a rotation rate of 120 rpm, within a temperature range of 190° C. to 210° C., and with die temperature of 195° C. to obtain particles. The aforesaid particles were dry mixed with the foaming agent in an amount shown in Table 1 below. Then, the particles thus obtained were fed into a profile extruder within a temperature range of 200° C. to 210° C. and with die temperature of 185° C. After foaming and extruding, a refrigeration shaping mold with temperature of 5° C. was used to manufacture a sheet foam product.

Examples 30 to 37

Mixtures were prepared with the constituents and contents given in Table 1 below, except for the petrochemical plastic and foaming agent, to obtain a mixture. Each of the aforesaid mixture was poured into a double screw extruder at a rotation rate of 120 rpm, within a temperature range of 170 to 190° C., and with die temperature of 180° C. to obtain poly lactic acid particles. After drying at 90° C. for 3 hours, the obtained poly lactic acid particles were processed with petrochemical plastic in an amount shown in Table 1 below. Then, the poly lactic acid particles thus obtained were dry mixed with the foaming agent in an amount shown in Table 1. After that, the aforesaid particles were fed into a profile extruder within a temperature range of 200° C. to 210° C. and with die temperature of 185° C. After foaming and extruding, a refrigeration shaping mold at temperature of 5° C. was used to manufacture a sheet foam product.

Examples 38

45 wt % of biodegradable polyester, 15 phr of reinforcing agent, 1 phr compatibilizer, 3 phr of lubricant, 3 phr of impact modifier, and 3 phr of polyolefin elastomer were well mixed to obtain a mixture. The aforesaid mixture was poured into a double screw extruder at a rotation rate of 120 rpm, within a temperature range of 170° C. to 190° C., and with die temperature of 180° C. to obtain poly lactic acid particles. After drying at 90° C. for 3 hours, the obtained poly lactic acid particles were processed with 55 wt % of petrochemical plastic, 15 phr of reinforcing agent, and 3 phr of lubricant. Then, the poly lactic acid particles thus obtained were dry mixed with 2 phr of foaming agent. After that, the aforesaid particles were fed into a profile extruder within a temperature range of 210° C. to 240° C. and with die temperature of 220° C. After foaming and extruding, a refrigeration shaping mold at temperature of 5° C. was used to manufacture a sheet foam product.

Examples 39

A sheet foam product was prepared in the same manner as that of Example 38, except that the amount of the foaming agent is 2.5 phr.

Examples 40

A sheet foam product was prepared in the same manner as that of Example 38, except that the amount of the foaming agent is 3.0 phr.

TABLE 1

|  |  | polyester alloy |  |  |  | reinforcing agent |  |  |  |
|---|---|---|---|---|---|---|---|---|---|
|  |  | biodegradable polyester | wt % | petrochemical plastic | wt % | substance 1 | phr | substance 2 | phr |
| Examples | 1 | PLA | 50 | PC | 50 | TP | 15 | — | — |
|  | 2 | PLA | 50 | PC | 50 | TP | 15 | — | — |
|  | 3 | PLA | 50 | PC | 50 | TP | 15 | — | — |
|  | 4 | PLA | 50 | PC | 50 | TP | 15 | — | — |
|  | 5 | PLA | 50 | PC | 50 | TP | 15 | — | — |
|  | 6 | PLA | 50 | PC | 50 | TP | 15 | — | — |
|  | 7 | PLA | 50 | PC | 50 | TP | 15 | — | — |
|  | 8 | PLA | 50 | PC | 50 | TP | 15 | — | — |
|  | 9 | PLA | 50 | PC | 50 | CS | 15 | — | — |
|  | 10 | PLA | 50 | PC | 50 | CS | 15 | — | — |
|  | 11 | PLA | 50 | PC | 50 | CS | 15 | — | — |
|  | 12 | PLA | 50 | PC | 50 | CS | 15 | — | — |
|  | 13 | PLA | 50 | PC | 50 | CS | 15 | — | — |
|  | 14 | PLA | 50 | PC | 50 | CS | 15 | — | — |
|  | 15 | PLA | 50 | PC | 50 | CS | 15 | — | — |
|  | 16 | PLA | 50 | PC | 50 | CS | 15 | — | — |
|  | 17 | PLA | 50 | PC | 50 | TP | 15 | — | — |
|  | 18 | PLA | 50 | PC | 50 | TP | 15 | — | — |
|  | 19 | PLA | 50 | PC | 50 | TP | 15 | — | — |
|  | 20 | PLA | 50 | PC | 50 | TP | 15 | — | — |
|  | 21 | PLA | 50 | PC | 50 | TP | 15 | — | — |
|  | 22 | PLA | 50 | PC | 50 | TP | 15 | — | — |
|  | 23 | PLA | 50 | PC | 50 | TP | 15 | — | — |
|  | 24 | PLA | 50 | PC | 50 | TP | 15 | — | — |
|  | 25 | PLA | 40 | PC | 60 | TP | 15 | — | — |
|  | 26 | PLA | 40 | PC | 60 | TP | 15 | — | — |
|  | 27 | PLA | 50 | PC | 50 | TP | 15 | — | — |
|  | 28 | PLA | 50 | PC | 50 | TP | 15 | — | — |
|  | 29 | PLA | 50 | PC | 50 | TP | 15 | — | — |
|  | 30 | PLA | 50 | PC | 50 | TP | 15 | — | — |
|  | 31 | PLA | 50 | PC | 50 | TP | 20 | — | — |
|  | 32 | PLA | 45 | PC | 55 | TP | 15 | — | — |

TABLE 1-continued

| | | | | | | | | | |
|---|---|---|---|---|---|---|---|---|---|
| 33 | PLA | 45 | PC | 55 | TP | 20 | — | — |
| 34 | PLA | 50 | PC | 50 | TP | 15 | CS | 5 |
| 35 | PLA | 50 | PC | 50 | TP | 15 | CS | 10 |
| 36 | PLA | 50 | PC | 50 | Tp | 15 | SD | 5 |
| 37 | PLA | 50 | PC | 50 | TP | 15 | SD | 10 |
| 38 | PLA | 45 | PC | 55 | TP | 30 | — | — |
| 39 | PLA | 45 | PC | 55 | TP | 30 | — | — |
| 40 | PLA | 45 | PC | 55 | TP | 30 | — | — |

| | | foaming agent | | compatibilizer | | lubricant | | modifier | | elastomer | |
|---|---|---|---|---|---|---|---|---|---|---|---|
| | | substance | phr | substance | phr | substance | phr | substance | phr | substance | phr |
| Examples | 1 | PE | 3.0 | F-g-AA | 5 | SA | 3 | MBS | 3 | — | — |
| | 2 | PEM | 6.0 | F-g-AA | 5 | SA | 3 | MBS | 3 | — | — |
| | 3 | PEE | 3.0 | F-g-AA | 5 | SA | 3 | MBS | 3 | — | — |
| | 4 | PEEM | 6.0 | F-g-AA | 5 | SA | 3 | MBS | 3 | — | — |
| | 5 | PEE | 3.0 | F-g-AA | 5 | SA | 3 | MBS | 3 | POE-g-MA | 5 |
| | 6 | PEEM | 6.0 | F-g-AA | 5 | SA | 3 | MBS | 3 | POE-g-MA | 5 |
| | 7 | PEE | 3.0 | F-g-AA | 5 | SA | 3 | MBS | 3 | POE-g-MA | 5 |
| | 8 | PEEM | 6.0 | F-g-AA | 5 | SA | 3 | MBS | 3 | POE-g-MA | 5 |
| | 9 | PE | 3.0 | F-g-AA | 5 | SA | 3 | MBS | 3 | — | — |
| | 10 | PEM | 6.0 | F-g-AA | 5 | SA | 3 | MBS | 3 | — | — |
| | 11 | PEE | 3.0 | F-g-AA | 5 | SA | 3 | MBS | 3 | — | — |
| | 12 | PEEM | 6.0 | F-g-AA | 5 | SA | 3 | MBS | 3 | — | — |
| | 13 | PEE | 3.0 | F-g-AA | 5 | SA | 3 | MBS | 3 | POE-g-MA | 5 |
| | 14 | PEEM | 6.0 | F-g-AA | 5 | SA | 3 | MBS | 3 | POE-g-MA | 5 |
| | 15 | PEE | 3.0 | F-g-AA | 5 | SA | 3 | MBS | 3 | POE-g-MA | 5 |
| | 16 | PEEM | 6.0 | F-g-AA | 5 | SA | 3 | MBS | 3 | POE-g-MA | 5 |
| | 17 | PEE | 1.5 | F-g-AA | 1 | SA | 3 | MBS | 3 | POE-g-MA | 5 |
| | 18 | PEE | 2.0 | F-g-AA | 1 | SA | 3 | MBS | 3 | POE-g-MA | 5 |
| | 19 | PEEM | 3.0 | F-g-AA | 1 | SA | 3 | MBS | 3 | POE-g-MA | 5 |
| | 20 | PEEM | 4.0 | F-g-AA | 1 | SA | 3 | MBS | 3 | POE-g-MA | 5 |
| | 21 | PEE | 1.5 | F-g-AA | 1 | SA | 3 | MBS | 3 | POE-g-MA | 5 |
| | 22 | PEE | 2.0 | F-g-AA | 1 | SA | 3 | MBS | 3 | POE-g-MA | 5 |
| | 23 | PEEM | 3.0 | F-g-AA | 1 | SA | 3 | MBS | 3 | POE-g-MA | 5 |
| | 24 | PEEM | 4.0 | F-g-AA | 1 | SA | 3 | MBS | 3 | POE-g-MA | 5 |
| | 25 | PEE | 1.5 | F-g-AA | 1 | SA | 3 | MBS | 3 | POE-g-MA | 5 |
| | 26 | PEE | 2.0 | F-g-AA | 1 | SA | 3 | MBS | 3 | POE-g-MA | 5 |
| | 27 | PEE | 1.5 | F-g-AA | 1 | SA | 3 | MBS | 3 | POE-g-MA | 7 |
| | 28 | PEE | 2.0 | F-g-AA | 1 | SA | 3 | MBS | 3 | POE-g-MA | 7 |
| | 29 | PEE | 2.5 | F-g-AA | 1 | SA | 3 | MBS | 3 | POE-g-MA | 1 |
| | 30 | PEE | 1.2 | F-g-AA | 1 | SA | 3 | MBS | 3 | POE-g-MA | 5 |
| | 31 | PEE | 1.2 | F-g-AA | 1 | SA | 3 | MBS | 3 | POE-g-MA | 5 |
| | 32 | PEE | 1.2 | F-g-AA | 1 | SA | 3 | MBS | 3 | POE-g-MA | 5 |
| | 33 | PEE | 1.2 | F-g-AA | 1 | SA | 3 | MBS | 3 | POE-g-MA | 5 |
| | 34 | PEE | 1.2 | F-g-AA | 1 | SA | 3 | MBS | 3 | POE-g-MA | 5 |
| | 35 | PEE | 1.2 | F-g-AA | 1 | SA | 3 | MBS | 3 | POE-g-MA | 5 |
| | 36 | PEE | 1.2 | F-g-AA | 1 | SA | 3 | MBS | 3 | POE-g-MA | 5 |
| | 37 | PEE | 1.2 | F-g-AA | 1 | SA | 3 | MBS | 3 | POE-g-MA | 5 |
| | 38 | PEE | 2.0 | F-g-AA | 1 | SA | 3 | MBS | 3 | POE-g-MA | 3 |
| | 39 | PEE | 2.5 | F-g-AA | 1 | SA | 3 | MBS | 3 | POE-g-MA | 3 |
| | 40 | PEE | 3.0 | F-g-AA | 1 | SA | 3 | MBS | 3 | POE-g-MA | 3 |

In Table 1, the acronyms stand for:
PLA: Poly Lactic Acid; PC: Poly Carbonate; TP: Talcum Powder; CS: Calcium Silicate; SD: Silicon Dioxide; PE: Polyolefin Expancel; PEM: Polyolefin Expancel Masterbatch; PEE: Polyolefin Ester Expancel; PEEM: Polyolefin Ester Expancel Masterbatch; F-g-AA: Fluoroplastic grafted with Acrylic Acid; SA: Stearamide Compound; MBS: Methacrylate-Butadiene-Styrene; and POE-g-MA: Polyolefin Elastomer-graft-Maleic Anhydride.

In the above-mentioned examples, polyolefin expandable microsphere is polypropylene expandable microsphere, polyolefin expandable microsphere (masterbatch) is 50% of polypropylene expandable microsphere/50% of polyethylene carrier, polyolefin ester expandable microsphere is polymethyl methacrylate expandable microsphere, polyolefin ester expandable microsphere masterbatch is 50% of polymethyl methacrylate expandable microsphere/50% of poly (ethylene vinyl acetate) copolymer carrier, and stearamide compound is N,N-ethylene-bis-stearamide.

Each sheet foam product has a length of 36 inches, which includes a central test area of 14 inches and two side areas of 11 inches respectively, a width of 5 cm, and a thickness of 0.3 cm.

Each sheet foam product was placed in a preheated oven of 48.8° C. The bending value of central test area of each sheet foam product was tested after the sheet foam product was heated for 30 minutes. Then, the other bending values were tested while the temperature is raised to the final temperature of 70° C. in increments of 5.6° C. Each increment shall be maintained for 30 minutes. The average bending value was calculated and evaluated. The bending test results are shown in Table 2 below.

TABLE 2

| | Bending Test of Sheet Foam Product |
|---|---|
| Example 1 | Δ |
| Example 2 | Δ |
| Example 3 | Δ |
| Example 4 | ◯ |
| Example 5 | Δ |
| Example 6 | Δ |

TABLE 2-continued

| | Bending Test of Sheet Foam Product |
|---|---|
| Example 7 | Δ |
| Example 8 | Δ |
| Example 9 | Δ |
| Example 10 | Δ |
| Example 11 | Δ |
| Example 12 | Δ |
| Example 13 | Δ |
| Example 14 | Δ |
| Example 15 | Δ |
| Example 16 | Δ |
| Example 17 | ○ |
| Example 18 | ○ |
| Example 19 | ○ |
| Example 20 | Δ |
| Example 21 | ○ |
| Example 22 | ○ |
| Example 23 | ○ |
| Example 24 | Δ |
| Example 25 | ○ |
| Example 26 | ◉ |
| Example 27 | Δ |
| Example 28 | Δ |
| Example 29 | ○ |
| Example 30 | ○ |
| Example 31 | ○ |
| Example 32 | ○ |
| Example 33 | ○ |
| Example 34 | ○ |
| Example 35 | ○ |
| Example 36 | ○ |
| Example 37 | ○ |
| Example 38 | ◉ |
| Example 39 | ○ |
| Example 40 | ○ |

In Table 2:
◉: Bending value less than 1/16 inch;
○: Bending value less than 1/8 inch; and
Δ: Bending value less than 1/4 inch.

The term "specific mechanical strength" mentioned in the present invention means that the bending value of the foam product made from the composition of the present invention is less than 1/4 inch.

Figure 2:
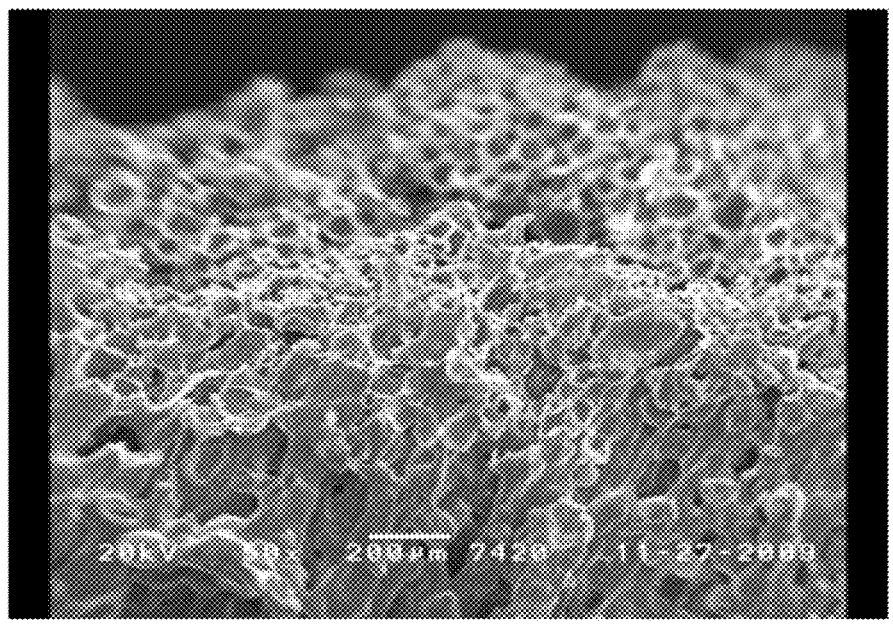
FIG. 2 shows an SEM photograph of a foam product made from a biomass composite composition according to an embodiment of the present invention.
Figure 3:
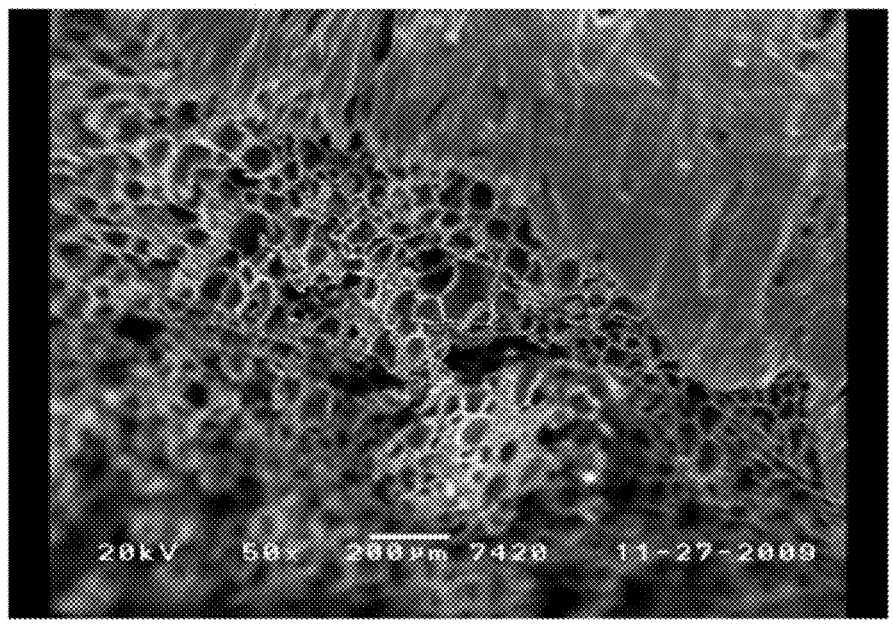
FIG. 3 shows an SEM photograph of another foam product made from another biomass composite composition according to another embodiment of the present invention.

As seen in Table 2, the constituents and contents of the compositions of the foregoing examples fall within the scope of the present invention, such that the foregoing examples can be foamed successfully. Besides, all of the foam products made from the compositions through the foaming method of the present invention have specific mechanical strength and homogeneous foam structure, as shown in FIGS. 2 to 3.

The biomass composite composition of the present invention is of biodegradable property and has superior heat resistance and melt strength than general biodegradable material, such that the composition of the present invention can be foamed to produce foam product. Furthermore, the foam product made from the biomass composite composition of the present invention has good heat resistance and specific mechanical strength and is partially biodegradable.

What is claimed is:

1. A biomass composite composition capable of providing a composite from which a foamed product having good heat resistance and strength is formed, comprising:
   (a) a polyester alloy containing 40-50% by weight of biodegradable polyester and 50-60% by weight of petrochemical plastic;
   (b) 15 to 20 phr of reinforcing agent;
   (c) 0.1 to 5 phr of foaming agent, wherein said foaming agent is core-shell expandable microsphere or core-shell expandable microsphere masterbatch made from said core-shell expandable microsphere;
   (d) 1 to 3 phr of compatibilizer;
   (e) 1 to 3 phr of lubricant; and
   (f) 1 to 3 phr of impact modifier.

2. The biomass composite composition according to claim 1, which further comprises (g) 1 to 10 phr of polyolefin elastomer.

3. The biomass composite composition according to claim 2, wherein said (g) polyolefin elastomer is polyolefin elastomer-graft-maleic anhydride (POE-g-MA).

4. The biomass composite composition according to claim 1, wherein said biodegradable polyester of (a) polyester alloy is poly lactic acid, poly butylene succinate, or biodegradable copolyester.

5. The biomass composite composition according to claim 1, wherein said petrochemical plastic of (a) polyester alloy is poly carbonate, poly methyl methacrylate, or polypropylene.

6. The biomass composite composition according to claim 1, wherein said (b) reinforcing agent is selected from the group consisting of talc powder, clay, mica, calcium carbonate, silicon dioxide, plant fiber, artificial fiber, wood flour, and sawdust.

7. The biomass composite composition according to claim 1, wherein said core-shell expandable microsphere is polyolefin expandable microsphere, polyolefin ester expandable microsphere, or biodegradable expandable microsphere, and said core-shell expandable microsphere masterbatch is polyolefin expandable microsphere masterbatch, polyolefin ester expandable microsphere masterbatch, or biodegradable expandable microsphere masterbatch.

8. The biomass composite composition according to claim 7, wherein said polyolefin expandable microsphere is polypropylene expandable microsphere, and said polyolefin expandable microsphere masterbatch is polypropylene expandable microsphere masterbatch.

9. The biomass composite composition according to claim 7, wherein said polyolefin ester expandable microsphere is polymethyl methacrylate expandable microsphere, and said polyolefin ester expandable microsphere masterbatch is polymethyl methacrylate expandable microsphere masterbatch.

10. The biomass composite composition according to claim 7, wherein said biodegradable expandable microsphere is poly lactic acid biomass polymer expandable microsphere, polycaprolactone biomass polymer expandable microsphere, or polyglycolic acid biomass polymer expandable microsphere, and said biodegradable expandable microsphere masterbatch is poly lactic acid biomass polymer expandable microsphere masterbatch, polycaprolactone biomass polymer expandable microsphere masterbatch, or polyglycolic acid biomass polymer expandable microsphere masterbatch.

11. The biomass composite composition according to claim 1, wherein a carrier of said core-shell expandable microsphere masterbatch is selected from the group consisting of polyethylene, polypropylene, polymethyl methacrylate, and poly (ethylene vinyl acetate) copolymer.

12. The biomass composite composition according to claim 1, wherein said (d) compatibilizer is fluoroplastic grafted with acrylic acid.

13. The biomass composite composition according to claim 1, wherein said (e) lubricant is at least one of stearic acid and its derivative.

14. The biomass composite composition according to claim 13, wherein said derivative of stearic acid is calcium stearate, zinc stearate, magnesium stearate, or stearamide.

15. The biomass composite composition according to claim 1, wherein said (f) impact modifier is a compound of a core-shell structure, and said shell is a polymer selected from the group consisting of olefin polymer, poly lactic acid biomass polymer, polycaprolactone biomass polymer, and polyglycolic acid biomass polymer.

16. The biomass composite composition according to claim 15, wherein said (f) impact modifier is methacrylate-butadiene-styrene copolymer.

* * * * *